United States Patent
Islam et al.

(10) Patent No.: US 9,641,229 B2
(45) Date of Patent: May 2, 2017

(54) METHOD AND SYSTEM FOR A RECONFIGURABLE OVER-INDEXED ANTENNA ARRAY

(71) Applicant: MOTOROLA MOBILITY LLC, Chicago, IL (US)

(72) Inventors: MD Rashidul Islam, Lombard, IL (US); Eric L Krenz, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/927,674

(22) Filed: Oct. 30, 2015

(65) Prior Publication Data
US 2017/0005707 A1    Jan. 5, 2017

Related U.S. Application Data

(60) Provisional application No. 62/186,427, filed on Jun. 30, 2015.

(51) Int. Cl.
| | |
|---|---|
| *H01Q 3/24* | (2006.01) |
| *H04B 7/0404* | (2017.01) |
| *H01Q 21/06* | (2006.01) |
| *H04B 7/06* | (2006.01) |
| *H01Q 1/24* | (2006.01) |

(52) U.S. Cl.
CPC .......... *H04B 7/0404* (2013.01); *H01Q 1/243* (2013.01); *H01Q 3/24* (2013.01); *H01Q 21/061* (2013.01); *H04B 7/0608* (2013.01)

(58) Field of Classification Search
CPC .......... H01Q 1/243; H01Q 21/28; H01Q 3/24; H01Q 21/061; H04M 2250/12
See application file for complete search history.

(56) References Cited

U.S. PATENT DOCUMENTS

| | | | |
|---|---|---|---|
| 7,646,354 B2* | 1/2010 | Martin | G06K 7/10178 235/487 |
| 2003/0092378 A1* | 5/2003 | Satoh | A63B 24/0006 455/11.1 |
| 2005/0088299 A1* | 4/2005 | Bandy | G08B 25/10 340/539.16 |

(Continued)

OTHER PUBLICATIONS

B. Zhang and Y.P. Zhang, "Analysis and Synthesis of Millimeter-Wave Microstrip Grid-Array Antennas", IEEE Antennas and Propagation Magazine, vol. 25, No. 6, Dec. 2011, 14 pages.

(Continued)

*Primary Examiner* — Vineeta Panwalkar
(74) *Attorney, Agent, or Firm* — Cygan Law Offices P.C.; Joseph T. Cygan

(57) ABSTRACT

A method and system for reconfiguring over-indexed antenna arrays in mobile devices are provided. For example, the method includes receiving sensor input that indicates an object blocking a first subset of reconfigurable antenna elements but not blocking a second subset of reconfigurable antenna elements of an over-indexed antenna array. The method also includes configuring, based on the sensor input, a number of the antenna elements in the first subset as non-active for radiating energy and a number of the antenna elements in the second subset as active for radiating energy.

18 Claims, 7 Drawing Sheets

(56) References Cited

U.S. PATENT DOCUMENTS

| | | | | |
|---|---|---|---|---|
| 2007/0025478 A1* | 2/2007 | Koga | .................... | H04B 7/0817 |
| | | | | 375/345 |
| 2007/0291831 A1* | 12/2007 | Lee | ........................ | H01Q 1/243 |
| | | | | 375/227 |
| 2013/0156080 A1* | 6/2013 | Cheng | .................... | H01Q 1/243 |
| | | | | 375/222 |
| 2013/0234910 A1 | 9/2013 | Oh et al. | | |
| 2013/0258964 A1* | 10/2013 | Nam | .................... | H04W 72/046 |
| | | | | 370/329 |
| 2014/0184464 A1* | 7/2014 | Ilnar | ...................... | H01Q 21/26 |
| | | | | 343/835 |

OTHER PUBLICATIONS

Lora Schulwitz and Amir Mortazawi, "A Compact Dual-Polarized Multibeam Phased-Array Architecture for Millimeter-Wave Radar", IEEE Transactions on Microwave Theory and Techniques, vol. 53, No. 11, Nov. 2005, 7 pages.

* cited by examiner

METHOD AND SYSTEM FOR A RECONFIGURABLE OVER-INDEXED ANTENNA ARRAY

RELATED APPLICATIONS

The present application is related to and claims benefit under 35 U.S.C. §119(e) from U.S. Provisional Patent Application Ser. No. 62/186,427, filed Jun. 30, 2015, titled "Method and System for a Reconfigurable Over-Indexed Antenna Array", which is commonly owned with this application by Motorola Mobility LLC, the entire contents of which are incorporated herein by reference.

FIELD OF THE DISCLOSURE

The present disclosure relates generally to antennas and more particularly to reconfigurable over-indexed antenna arrays for wireless communication.

BACKGROUND $5^{th}$ Generation (5G) wireless systems or mobile networks denote the next major phase of mobile telecommunications beyond the current 4G standards. It is expected for a 5G network to support, for instance: data rates of several tens of Mb/s for tens of thousands of users; at least 1 Gbit/s simultaneously for tens of users in a small area network; improved coverage; enhanced signaling efficiency; reduced latency; and significantly enhanced spectral efficiency over 4G networks.

Moreover, frequencies exceeding 24 GHz are expected to be needed to support 5G networks. Accordingly, one or more antenna arrays having multiple antenna elements operating in unison, as opposed to a single antenna, will likely be required to support such high frequencies. However, the effect of "shadowing" or blocking of antenna elements by a user's hand or any other object can result in a lower antenna gain and in some circumstances an inability to meet antenna gain and scanning angle requirements for communicating with an external device.

BRIEF DESCRIPTION OF THE FIGURES

The accompanying figures, where like reference numerals refer to identical or functionally similar elements throughout the separate views, form part of the specification and illustrate embodiments in accordance with the included claims.

Figure 1:
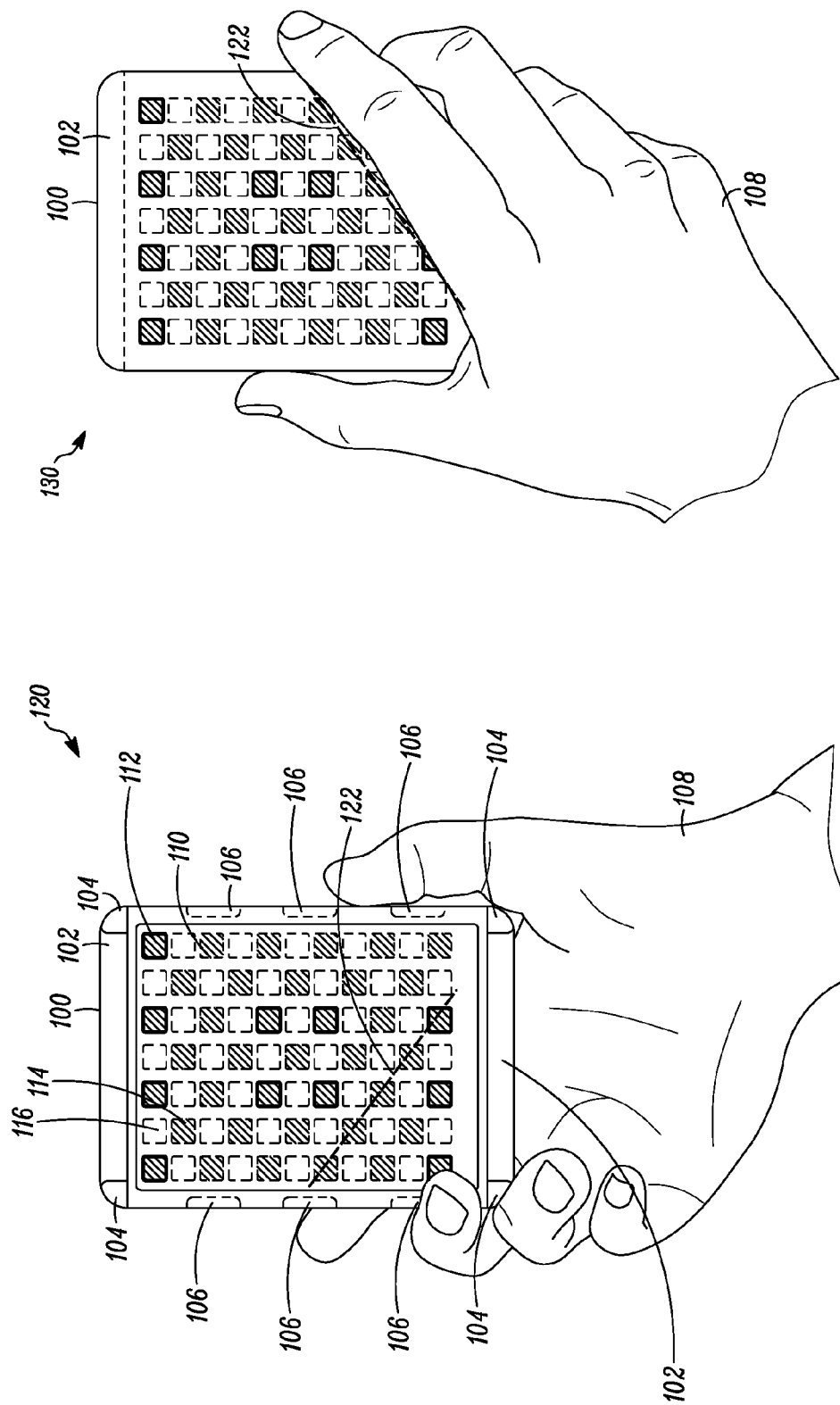
FIG. 1 illustrates a schematic diagram of a mobile device having a reconfigurable over-indexed antenna array, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The system and method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and system for reconfiguring an over-indexed antenna array. For an embodiment, the method includes receiving sensor input that indicates an object blocking a first subset of reconfigurable antenna elements but not blocking a second subset of reconfigurable antenna elements of an over-indexed antenna array. The method also includes configuring, based on the sensor input, a number of the antenna elements in the first subset as non-active for radiating energy and a number of the antenna elements in the second subset as active for radiating energy (also referred to herein as active elements). The antenna elements configured as non-active for radiating energy can be configured as sensor elements and/or passive elements. The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality.

Further in accordance with the teachings herein, a system includes an over-indexed antenna array having a plurality of antenna elements reconfigurable for multiple uses. The system also includes a set of sensors configured to provide sensor input that indicates an object blocking a first subset of the plurality of antenna elements but not blocking a second subset of the plurality of antenna elements. Further included in the system is a controller coupled to the set of sensors and the over-indexed antenna array. The controller is configured to receive the sensor input and configure, based on the sensor input, a number of the antenna elements in the first subset as non-active for radiating energy and a number of the antenna elements in the second subset as active for radiating energy.

Many illustrative benefits can be realized using the described embodiments. For example, the redundancy of antenna elements coupled with the ability to reconfigure the antenna elements for different uses, e.g., active, passive, or sensor, allows a mobile device to maintain a required antenna gain and scanning angle when some of the antenna elements are blocked. Additionally, blocked antenna elements and antenna elements not needed to meet gain and scanning angle requirements can be easily turned off to save power. Moreover, a judicious selection of active elements allows an enhancement of antenna gain. For example, the active element separation can be increased by interleaving more passive elements to increase the peak gain. An additional example benefit is that the reconfigurability of the antenna elements helps to respond to a time varying situation where the user is moving his hands. A further example benefit is the improved aesthetic appeal to the mobile device, by the continuity of the antenna elements, when placing the antenna elements external to the mobile device housing.

FIG. 1 shows an embodiment of a communication device 100 having a reconfigurable over-indexed antenna array. As shown, the communication device 100 is held in a user's right hand 108. Example communication devices include a smartphone, a cellular phone, a phablet, a tablet, a personal digital assistant, a mobile phone, a media player, a laptop, or another type of portable electronic device capable of communicating with other devices, base stations, and cell towers in accordance with various aspects of the disclosed embodiments. For one embodiment, the communication device 100 is configured to operate in accordance with various Wi-Fi standards (e.g., 802.11 a, b, g, n, ac) and cellular technologies. For a particular embodiment, the communication device 100 is configured to support 5G wireless communications but can also be used to support other types of wireless communications including 4G.

FIG. 1 depicts a front view 120 of the communication device 100 showing a plurality of fixed corner sensors 104; a plurality of fixed edge sensors 106; and a reconfigurable over-indexed antenna array 110. Areas 102 are portions of the communication device 100 that may or may not have antenna elements. FIG. 1 also shows a rear view 130 of the communication device 100. For purposes of the illustration shown in FIG. 1, the antenna array 110 is inside the communication device 100 and outside of the view of the user. However, as explained later in detail, embodiments provide for the coupling of the antenna array 110 on the outside of a housing encasing internal components of the communication device 100.

The antenna array 110 is "over-indexed" because there are more antenna elements than are required for the device 100 to communicate wirelessly. Accordingly, in an instance when an object is covering some antenna elements in the array 110, the shadowed antenna elements can be switched to passive or sensor elements that don't radiate energy, and the array 110 would still have sufficient antenna elements remaining to communicate with an external device such as a base station. As shown, the array 110 includes a plurality of antenna elements that are illustrated as small squares. Namely, the plurality of antenna elements are substantially equally spaced, have a substantially similar height and shape, and substantially fill the entire area suitable for mounting antenna elements. However, other antenna arrangements can be envisioned with different shapes and relative distances and spatial orientations therebetween.

In accordance with an embodiment of the present teachings, each antenna element is configurable for three different alternative functions. In other words, each antenna element can be switched or controlled between three different alternative states. More specifically, each antenna element can alternately be switched between functioning as an active element 114 for radiating radio frequency (RF) energy (each shown as a hashed square with an unenhanced border) or as non-active for radiating energy. When non-active for radiating energy, the antenna element can be configured as a passive loading element 116 (each shown as a white square) or as a sensor element 112 (each shown as a hashed square with an enhanced border).

Particularly, the antenna array 110 operates by exciting or energizing multiple antenna active elements 114 to operate in unison to produce one or more antenna beams directed toward an external device, in order to wirelessly communicate with the external device. The communication device 100 is programmed with a required minimum antenna gain and scanning angle for the one or more antenna beams to facilitate effective and efficient communication. Various mathematical algorithms, which can be any number of well-known algorithms, are implemented to determine the phase and signal amplitude to apply to each active antenna element to meet the required combined gain and scanning angle for the one or more antenna beams. "Scanning angle" is the angle of the one or more antenna beams formed by antenna array 110 with respect to a local coordinate system centered on the device 100. Since there are more antenna elements in the array 110 than required to communicate, it is easier to achieve and maintain the required antenna gain and scanning angle using the disclosed embodiment even as a user changes hand positions on the communication device 100.

Figure 2:
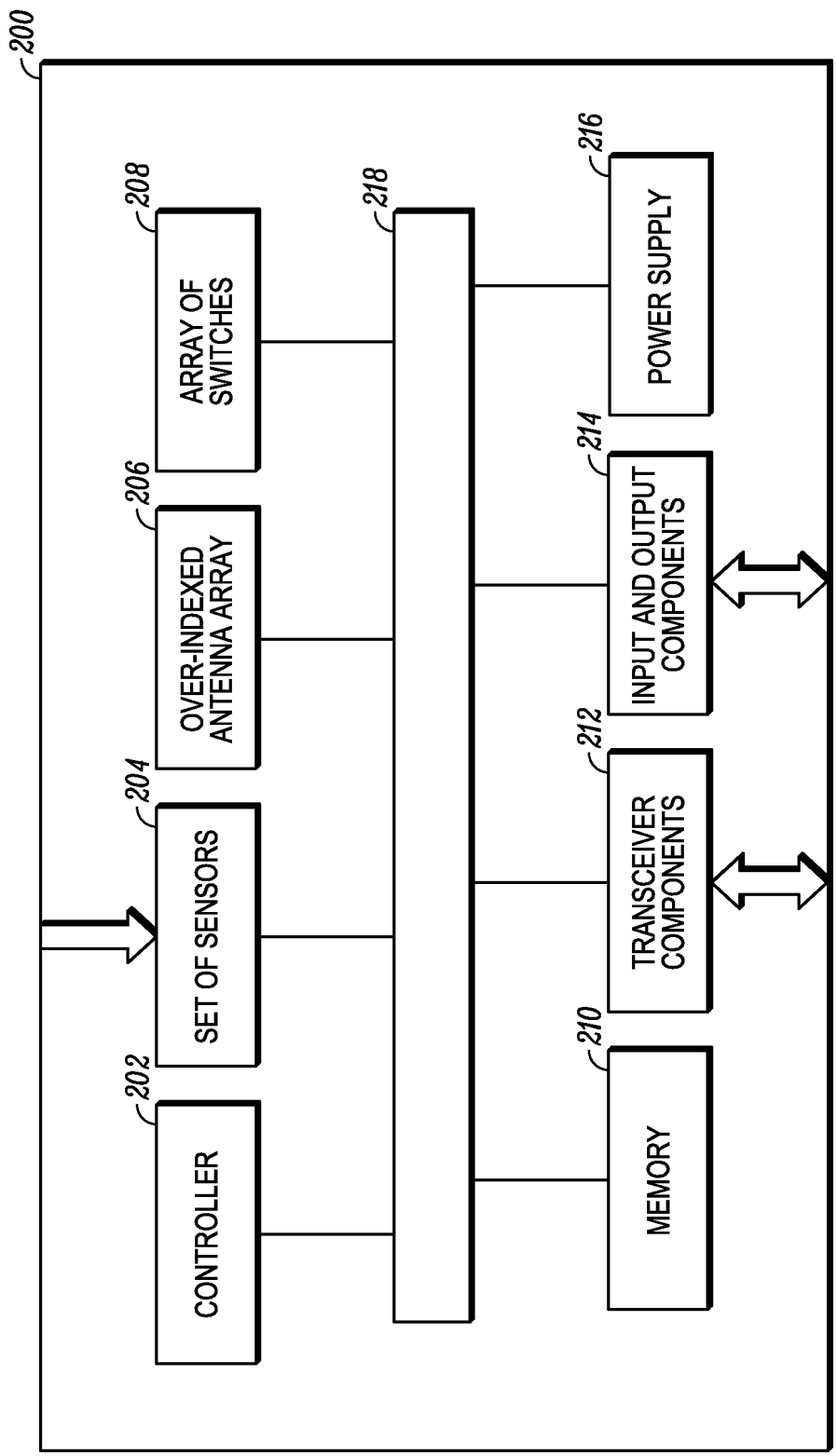
FIG. 2 illustrates a block diagram of internal hardware components of a mobile device having a reconfigurable over-indexed antenna array, in accordance with some embodiments.

FIG. 2 illustrates internal hardware components 200 of a system, such as the communication device 100, having a reconfigurable over-indexed antenna array, in accordance with some embodiments. The hardware components 200 include a controller 202, a set of sensors 204, an over-indexed antenna array 206, an array of switches 208, memory 210, one or more transceiver components 212, input and output components 214, and a power supply 216 operatively and communicatively coupled by internal couplings or connections 218, which can include a bus or other direct or indirect hardware connections. A limited number of device components 202, 204, 206, 208, 210, 212, 214, 216, and 218 are shown as internal components 200 for ease of illustration. Other embodiments may include a lesser or greater number of components in a communication device.

The components 200 are configured to cooperatively operate to reconfigure the over-indexed antenna array 206 in accordance with embodiments as illustrated, for instance, by reference to the remaining FIGS. 3 to 9. "Configured," "adapted," "operative," or "capable" means that indicated components are implemented using one or more hardware elements, which may or may not be programmed with software and/or firmware, as the means for the indicated components to implement their desired functionality.

For an embodiment, the controller 202 controls the reconfiguring of the antenna elements of the over-indexed antenna array 206, for instance using methods illustrated by reference to FIGS. 3 and 4. For example, the controller 202 receives sensor input from the set of sensors 204, and from the indication contained in the sensor input determines whether objects are blocking any of the antenna elements of the array 206. Responsively and based on the sensor input, the controller 202 determines whether and how to reconfigure the antenna array 206 from a first configuration to a second configuration to enable the communication device 100 to wirelessly communicate with an external device.

For one implementation, the controller 202 includes arithmetic logic and control circuitry necessary to perform the processing, in whole or in part, for the device 100 to enable reconfiguration of the over-indexed antenna array 206 in accordance with described embodiments for the present teachings. The controller 202 can be combined as part of main or core processing capabilities within the device 100, for instance as a system-on-chip ("SOC"). Alternatively, the controller 202 provides separate and auxiliary processing and control capabilities. In one particular implementation, the controller 202 provides processing and control capabilities that are dedicated to reconfiguring the over-indexed antenna array 206.

The over-indexed antenna array 206 includes a plurality of antenna elements where each element can be reconfigured for multiple uses. The antenna array 110 of FIG. 1 gives an example arrangement for an over-indexed antenna array. Additional details for an over-indexed antenna array according to the present teachings are described by reference to other drawings, e.g., FIGS. 6 to 9.

The set of sensors 204 are configured to detect an object at or near the communication device 102, such as a user's hand or other body part. Such sensors include at least the antenna elements of the array 110 configured as sensor elements 112. For a device that includes additional sensors, such as the fixed edge 106 and corner 104 sensors, coupled to or included within the communication device 100, the set of sensors 204 can also use these fixed sensors to provide sensor input that indicates an object blocking some of the antenna elements but not blocking other of the antenna elements of the antenna array 206. For the embodiment where the sensors 204 include one or more fixed sensors, the antenna elements can be switchable between two states, namely, an active element and a passive elements, with the sensor functionality being performed solely by the fixed sensors. The sensors within sensor array 204 can be any suitable sensor including, but not limited to, capacitive sensors and/or infrared sensors that detect proximity of an object. Moreover, the fixed sensors can be located on other parts of the communication device 100 such as the back of the communication device.

The array of switches 208 is configured to switch the antenna elements of the antenna array 206 between the different states. For an embodiment, the array of switches 208 is coupled to the controller 202 to receive a control signal to control the switching functionality. For a particular embodiment, each antenna element in the antenna array 206 is coupled to a single switch in the array of switches 208. Illustratively, the switches are single-pole-double-throw ("SP2T") switches. For one embodiment, each switch in the array of switches 208 has a first switch position to configure an antenna element as active for radiating energy, a second switch position to configure the antenna element as the sensor element, and a third switch position to configure the antenna element as the passive element. For another embodiment, for instance using a different type of switch, switch, multiple antenna elements are coupled to the same switch. For yet another embodiment, each switch in the array of switches 208 has a first switch position to configure an antenna element as active for radiating energy and a second switch position to configure the antenna element as the passive element.

The memory component 210, in various embodiments, can include one or more of: volatile memory elements, such as random access memory ("RAM"); or non-volatile memory elements, such as a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), or a Flash memory. In an embodiment, the memory component 210 includes a region of shared memory accessible to various components of the device 100, such as the controller 202 and the transceiver component 212.

For one embodiment, the transceiver components 212 include a cellular transceiver to enable the communication device 100 to communicate with other electronic devices using one or more cellular networks. Cellular networks can use any wireless technology that, for example, enables broadband and Internet Protocol (IP) communications including, but not limited to, $3^{rd}$ Generation (3G) wireless technologies such as CDMA2000 and Universal Mobile Telecommunications System (UMTS) networks, $4^{th}$ Generation (4G) wireless technologies such as LTE and WiMAX, or emerging $5^{th}$ Generation technologies.

In another embodiment, the transceiver components 212 include a wireless local area network (WLAN) transceiver that allows the communication device 100 to access the Internet using standards such as Wi-Fi. The WLAN transceiver allows the communication device 100 to send and receive radio signals to and from similarly equipped devices using a wireless distribution method, such as a spread-spectrum or orthogonal frequency-division multiplexing (OFDM) method. For some embodiments, the WLAN transceiver uses an IEEE 802.11 standard to communicate with other devices in the 2.4, 3.6, 5, and 60 GHz frequency bands. In a particular embodiment, the WLAN transceiver uses Wi-Fi interoperability standards as specified by the Wi-Fi Alliance to communicate with other Wi-Fi certified devices.

In an embodiment, the transceiver component 212 has a plurality of transceiver paths, such that the over-indexed antenna array 206 includes enough antenna elements to form multiple groups of antenna elements with each group of antenna elements being coupled to a different transceiver path of the plurality of transceiver paths to implement multi-input and multiple-output communications. Each group of antenna elements could function as separate antenna sub-arrays. For another embodiment, the antenna array 206 is capacitively coupled to the transceiver component 212. For yet another embodiment, the antenna array 206 is connected by a direct feed from the transceiver component 212.

The input and output components 214 represent user-interface components of the device 100 configured to allow a person to use, program, or otherwise interact with the device 100. Different communication devices for different embodiments include different combinations of input and output components 214. A touchscreen, for example, functions both as an output component and an input component for some embodiments by allowing a user to see displayed view elements for a mobile application and to actuate the view elements by tapping on them. For other embodiments, peripheral devices such as keyboards, mice, and touchpads, represent input components that enable a user to interact with the device 100. A speaker is an output component that for some embodiments allows a communication device to verbally prompt a user for input. Particular embodiments include an acoustic transducer, such as a microphone, as an input component that converts received acoustic signals into electronic signals, which can be encoded, stored, and processed for voice recognition, for instance.

The power supply 216 represents a power source that supplies electric power to the device components 200, as needed, during the course of their normal operation. The power is supplied to meet the individual voltage and load requirements of the device components 202, 204, 206, 208, 210, 212, and 214 that draw electric current. For some embodiments, the power supply 216 is a wired power supply that provides direct current from alternating current using a full- or half-wave rectifier. For other embodiments, the power supply 216 is a battery that powers up and runs a mobile device. For a particular embodiment, the battery 216 is a rechargeable power source. A rechargeable power source for a device is configured for temporary connection to another power source external to the device to restore a charge of the rechargeable power source when it is depleted or less than fully charged. In another embodiment, the battery 216 is simply replaced when it no longer holds sufficient charge.

Figure 3:
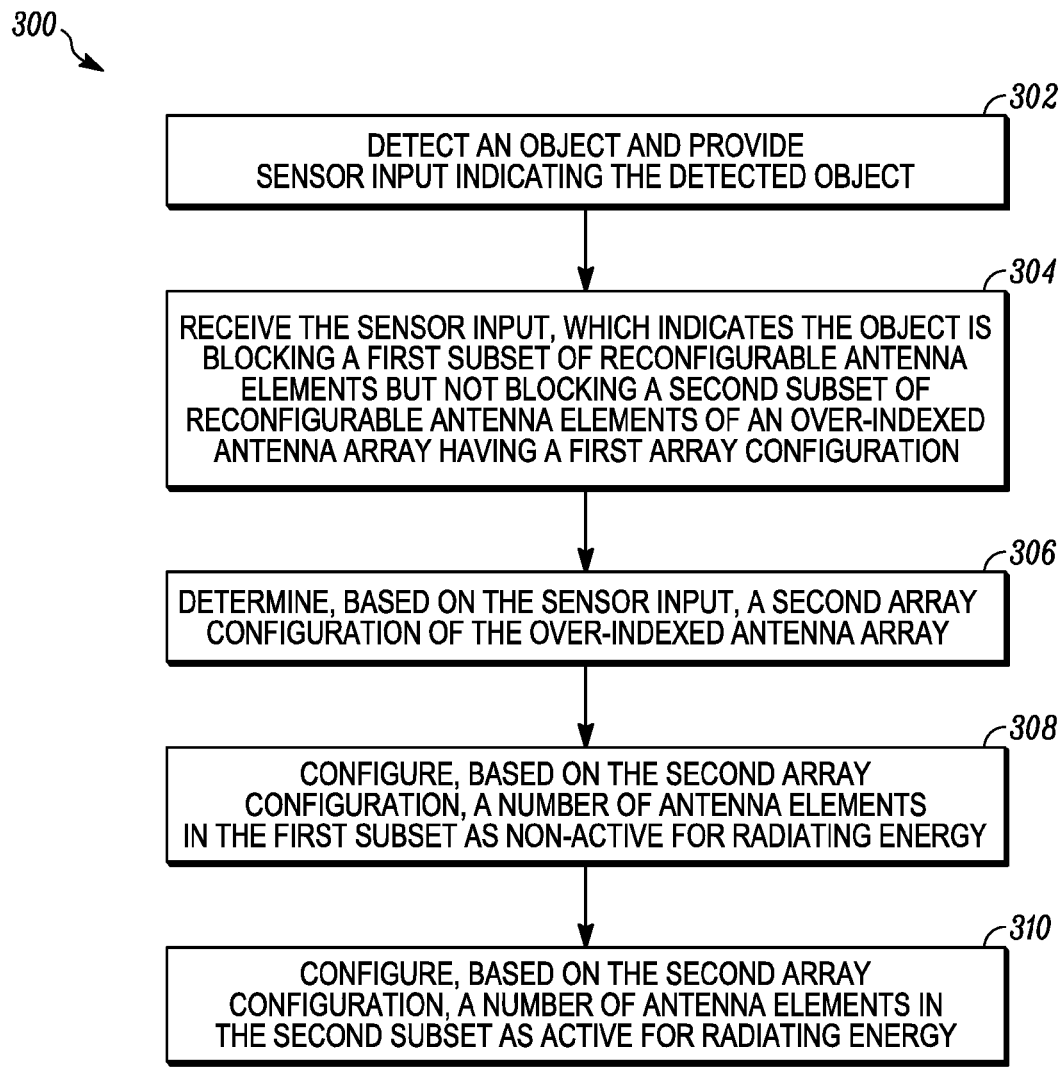
FIG. 3 shows a logical flow diagram illustrating a method for reconfiguring an over-indexed antenna array, in accordance with some embodiments.

FIG. 3 shows a logical flow diagram illustrating a method 300 for reconfiguring an antenna array, in accordance with some embodiments. In performing the method 300, the set of sensors 204, for instance in the device 100, detects 302 an object and provides sensor input, for instance to the controller 202, indicating the detected object. The device 100 receives 304 the sensor input and determines that it indicates the object is blocking a first subset of reconfigurable antenna elements but not blocking a second subset of reconfigurable antenna elements of the over-indexed antenna array 110, which has a first array configuration as shown in view 120 of FIG. 1.

For an embodiment, this first antenna array configuration shown in FIG. 1 is for the device 100 in an idle state. Accordingly, the antenna array 110 is configured with enough active elements 114 to enable the device 100 to communicate with a base station to, for instance, set up a call or data session. The remaining antenna elements are configured within this first antenna array configuration as passive elements 116 to conserve battery life and as sensor elements 112 to assist in detecting the user's hand 108 position on the device 100.

Let us assume that the user has just picked up the device 100, and the device 100 detects that the user is starting a call or data session. As can be seen in the rear view 130, some of the antenna elements are blocked or shadowed by the user's hand 108. A dashed line 122 delineates a first subset of the antenna elements of the array 110 (below the line 122) that are blocked from a second subset of the antenna elements of the array 110 (above the line 122) that are not blocked. Based on the particular antenna elements indicated by the sensor input as blocked and/or unblocked, the device 100, for instance using the controller 202 or another processing element, determines 306 a second array configuration for the antenna array 110. Suitable algorithms in the device 100, for instance as mentioned above, can be used to determine 306 how to configure each antenna element of the antenna array 110.

Many if not all of the blocked antenna elements 308 may have their performance impacted by the blocking effect of the hand 108 to an extent that renders them unusable to effectively radiate energy. Therefore, the device 100 configures 308, based on the second array configuration, a number of antenna elements in the first subset as non-active for radiating energy. Moreover, since at least some of the unblocked antenna elements are needed to create one or more antenna beams for the call or data session, the device 100 configures 310, based on the second array configuration, a number of antenna elements in the second subset as active for radiating energy.

Figure 5:
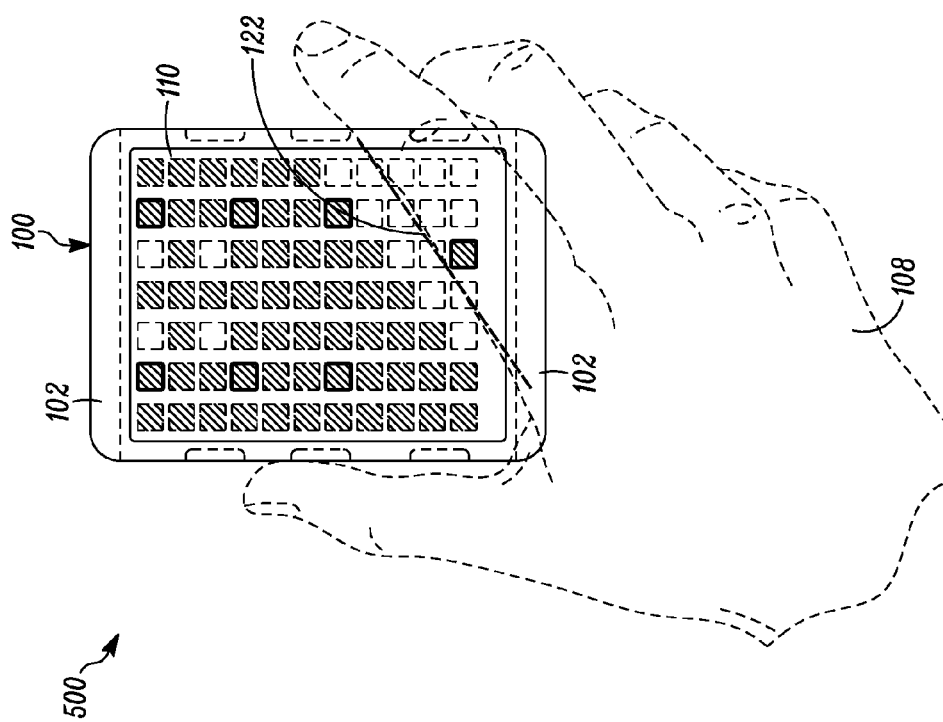
FIG. 5 illustrates a schematic diagram of a mobile device having an over-indexed antenna array that was reconfigured using methods in accordance with some embodiments.

FIG. 5 depicts a view 500 illustrating the antenna array 110 of the device 100 configured with an example second array configuration. As can be seen, the blocked antenna elements below the line 122 are mostly configured as passive elements, which can help to conserve battery life. However, one or more antenna elements can (as shown) be configured as a sensor element to detect when the user moves the hand 108 from the current location on the device 100.

Moreover, the unblocked antenna elements above the line are mostly configured as active antenna elements to carry out the call or data session. However, one or more antenna elements can (as shown) be configured as a sensor element to detect when the user moves the hand 108 from the current location on the device 100. Additionally, one or more antenna elements can (as shown) be configured as a passive element to affect the gain of the one or more antenna beams generated using the second configuration of the antenna array 110. Namely, increasing the separation between active antenna elements 114 can increase the gain of the antenna array 110 by decreasing mutual coupling between some active elements 114. Additional elements directly above the line 122, and close to the hand 108, can also be configured as passive elements, as slight movements of the user's hand 108 may also impact their performance.

In a further embodiment, a first number of the antenna elements in the second subset above the line 122 are configured as active for radiating energy for multiple-input and multiple-output communication. In another embodiment, a first number of the antenna elements in the second subset above the line 122 are configured as active for radiating energy to satisfy gain requirements for fifth generation wireless communications.

Figure 4:
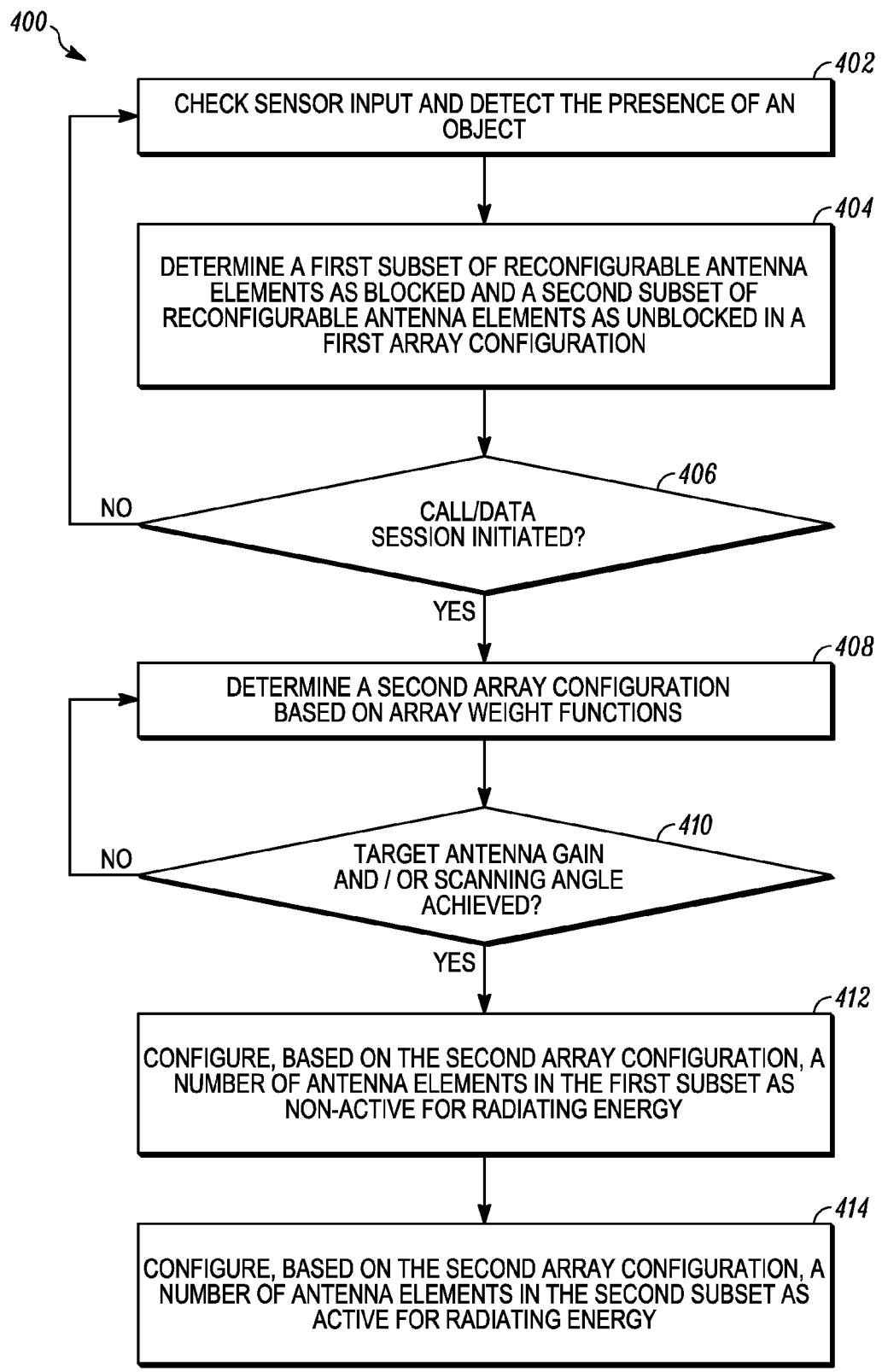
FIG. 4 shows a logical flow diagram illustrating another method for reconfiguring an over-indexed antenna array, in accordance with some embodiments.

FIG. 4 shows a logical flow diagram illustrating a method 400 for reconfiguring an antenna array 110, in accordance with some embodiments. The method 400 considers some illustrative parameters that can be used to, for instance, reconfigure the antenna array 110 from the first antenna array configuration shown in FIG. 1 to the second antenna array configuration shown in FIG. 5.

The functional blocks 402 and 404 of the method 400 are similar to the functional blocks 302 and 304 of method 300, the description of which is not repeated for the sake of brevity. However, with method 400, the device 100 only determines 408 the second array configuration after detecting 406 that the user has initiated a call or a data session. Moreover, for this embodiment, the device 100 determines the second array configuration based on array weight functions. "Weights" are the signal amplitude and phase of each of the antenna elements that forms the array 110. Accordingly, for a particular embodiment, the device 100 determines 408, based on at least one of a target antenna gain or a target scanning angle, one or both of: location, in the antenna array 110, of the first number of the antenna elements in the second subset (above the line 122) configured as active for radiating energy; or location, in the antenna array, of the first portion of the second number of the antenna elements in the second subset (above the line 122) configured as passive elements. The device 100 continues the determination 408 until 410 the target antenna gain and/or scanning angle is achieved.

At block 412, the device 100 configures, based on the second array configuration, a number of antenna elements in the first subset (below the line 122) as non-active for radiating energy. Some of the antenna elements are configured as passive elements 116, and some can be configured as sensor elements 112. Moreover, at block 414, the method 400 configures, based on the second array configuration, a number of antenna elements in the second subset (above the line 122) as actively radiating energy. Additionally, the device 100 can configure a number of antenna elements as sensor elements 112 and a number of the antenna elements as passive elements 116.

Figure 6:
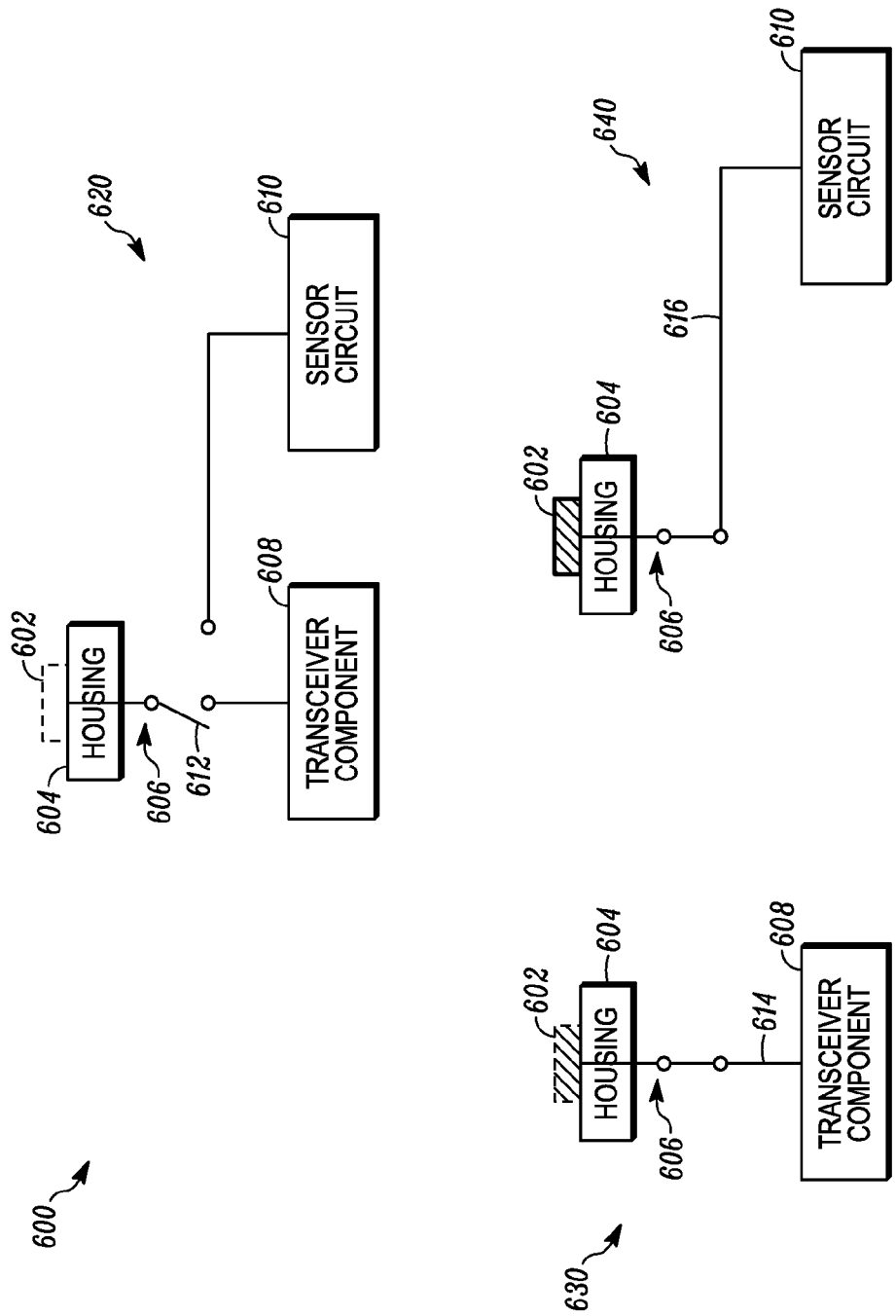
FIG. 6 shows a cross-sectional view of multiple configurations of a reconfigurable antenna element, in accordance with some embodiments.

FIG. 6 shows a cross-sectional view 600 of multiple configurations of a reconfigurable antenna element, in accordance with some embodiments. Specifically, FIG. 6 includes an antenna element 602, a device housing 604, a SP2T switch 606, a transceiver component 608, and a sensor circuit 610. As indicated above, the antenna element 602 can be configured as: a passive antenna element that is non-active for radiating energy, as shown in a configuration 620; an active antenna element that is active for radiating energy, as shown in a configuration 630; and as a sensor element that is non-active for radiating energy, as shown in configuration 640.

In the configuration 620, switch 606 is in an open position 612. In the open position 612, the antenna element 602 is not connected to either the transceiver component 608 or the sensor circuit 610. In addition, when the switch 606 is in the open position 612 the antenna element 602 does not consume power. Each switch 606 needs a positive DC voltage, for instance from the power supply 216, to operate as a switch. When there is no DC voltage to the switch 606, the switch can function as an ideal open circuit and be considered in an off state. Thus, for an embodiment, when the switch 606 is turned off, the antenna element 602 acts or functions or is used as a passive antenna element.

In the configuration 630, a positive DC voltage is applied, and the switch 606 is in a closed position 614 coupling the antenna element 602 to the transceiver component 608. In the configuration 630, a feed line couples the antenna element 602 to the transceiver component 608 to enable the antenna element 602 to radiate energy, for instance using the gain and phase determined for the antenna element 602. In the configuration 640, a positive DC voltage is applied, and the switch 606 is in a closed position 616 coupling the antenna element 602 to the sensor circuit 610 to enable the antenna element to sense an object on or near the device housing 604.

Figure 7:
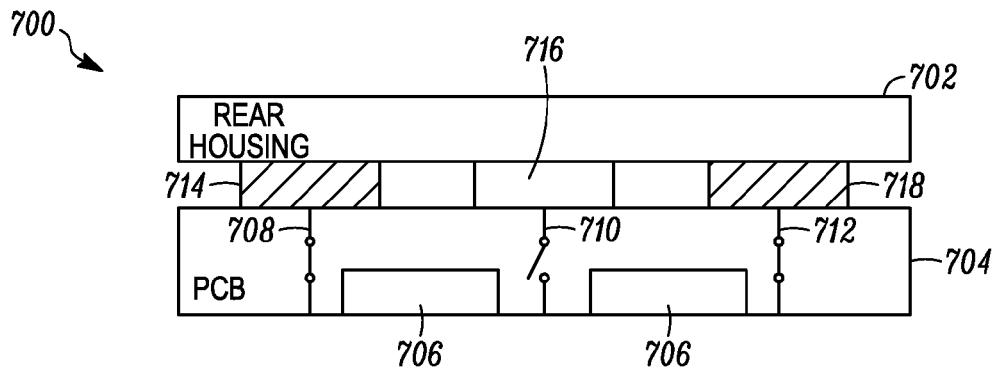
FIG. 7 shows a cross-sectional view of a section of a reconfigurable antenna array coupled to a device housing and a printed circuit board, in accordance with some embodiments.
Figure 8:
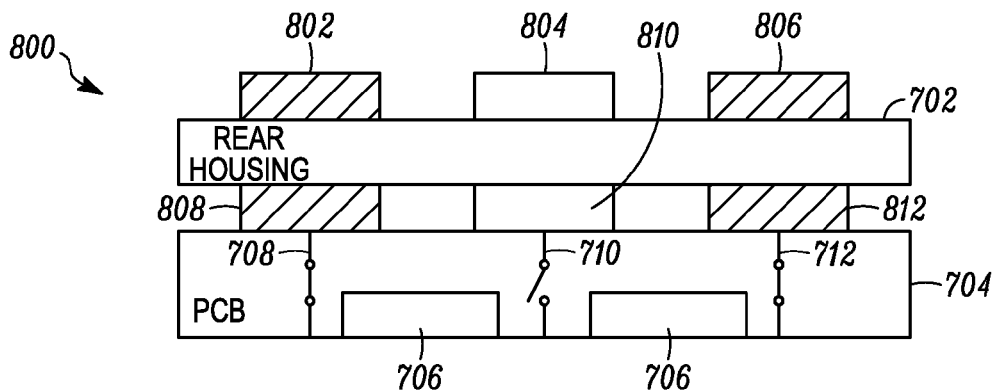
FIG. 8 shows a cross-sectional view of a section of a reconfigurable antenna array coupled to a device housing and a printed circuit board, in accordance with some embodiments.
Figure 9:
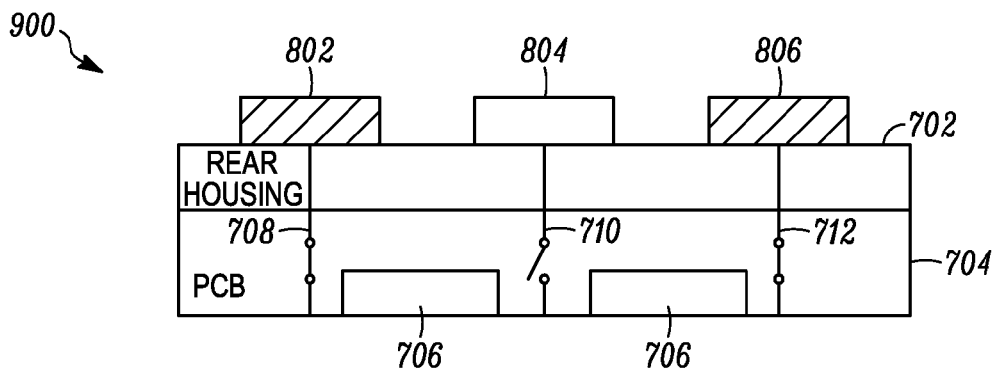
FIG. 9 shows a cross-sectional view of a section of a reconfigurable antenna array coupled to a device housing and a printed circuit board, in accordance with some embodiments.

FIGS. 7, 8, and 9 illustrate how antenna elements can be coupled to a printed circuit board (PCB) in relation to a housing of a communication device. Each of FIGS. 7, 8, and 9 shows a cross-sectional view, respectively, 700, 800, and 900, of a section of a reconfigurable antenna array coupled to a device rear housing 702 and a PCB 704, in accordance with some embodiments. Each of FIGS. 7, 8, and 9 also shows a transceiver component (e.g., an integrated circuit (IC)) 706 on the PCB 704. Further shown are three switches 708, 710, and 712 that can couple respective antenna elements to the transceiver component using a probe feed when the switch is in one of the closed positions. As an example only, switches 708 and 712 are closed, and switch 710 is open.

"Probe feed" is defined herein as a connection utilizing a small electrically conductive probe from the PCB 704 that maintains contact with the switch to couple an antenna element to the transceiver IC. Probe feeds to antennas are generally known in the art and are thus not described herein in further detail for the sake of brevity. Moreover, it should be noted that the direct physical connections that enable the probe feeds between the transceiver IC 706 and the switches 708, 710, and 712 are not explicitly shown but can be implemented, for instance, using traces on the PCB 704.

For an embodiment, the switches 708, 710, and 712 are SP2T switches. However, a sensor circuit is not shown on the PCB 704 in this particular cross-sectional view. Furthermore, for a particular embodiment, not shown, the transceiver IC 706 is located on a secondary PCB; intermediate frequency cables connect the transceiver IC 706 to the PCB 704; and a battery (not shown) is within a ground metal cavity (not shown) and powers the switches 708, 710, and 712.

The antenna array portion shown in FIG. 7 includes antenna elements 714, 716, and 718. FIG. 7 illustrates a particular embodiment where the antenna array is coupled within an interior of the housing 702, and the antenna array is connected by a direct feed from the transceiver component 706. Accordingly, the antenna elements 714 and 718 are configured as active elements, and the antenna element 716 is configured as a passive element.

The antenna array portion shown in FIG. 8 includes antenna elements 802, 804, and 806. FIG. 8 illustrates a particular embodiment where the antenna array is coupled to an exterior of the housing 706 in an area suitable for mounting antenna elements, and the antenna array is capacitively coupled to the transceiver component 706. For example, metal elements 808, 810, and 812 when connected to the switches 708, 710, and 712 can capacitively couple the antenna elements 802, 804, and 806 to the transceiver component 706 using a narrow gap provided by the thickness of the housing. As shown, the antenna elements 802 and 806 are configured as active elements through the capacitive coupling, and the antenna element 804 is configured as a passive element.

The antenna array portion shown in FIG. 9 includes antenna elements 802, 804, and 806. FIG. 9 illustrates a particular embodiment where the antenna array is coupled to an exterior of the housing 706 in an area suitable for mounting antenna elements, and the antenna array is connected by a direct feed from the transceiver component 706. Accordingly, the antenna elements 802 and 806 are configured as active elements, and the antenna element 804 is configured as a passive element.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for configuring an over-indexed antenna array, the method comprising:
receiving sensor input that indicates an object blocking a first subset of reconfigurable antenna elements but not blocking a second subset of reconfigurable antenna elements of an over-indexed antenna array, each antenna element reconfigurable as a sensor element, where a number of the antenna elements in the first subset are configured as sensor elements and provide the sensor input; and
configuring, based on the sensor input, a number of the antenna elements in the second subset as active for radiating energy.

2. The method of claim 1, wherein the sensor input indicates a mobile device user's hand blocking the first subset of reconfigurable antenna elements.

3. The method of claim 1, wherein a first number of the antenna elements in the first subset are configured as passive elements.

4. The method of claim 1, wherein a first number of the antenna elements in the second subset are configured as active for radiating energy for multiple-input and multiple-output communication.

5. The method of claim 1, wherein a first number of the antenna elements in the second subset are configured as active for radiating energy to satisfy gain requirements for fifth generation wireless communications.

6. A method for configuring an over-indexed antenna array, the method comprising:
receiving sensor input that indicates an object blocking a first subset of reconfigurable antenna elements but not blocking a second subset of reconfigurable antenna elements of an over-indexed antenna array; and
configuring, based on the sensor input, a number of the antenna elements in the second subset as active for radiating energy, wherein a first number of the antenna elements in the second subset are configured as active for radiating energy, and a second number of the antenna elements in the second subset are configured as non-active for radiating energy.

7. The method of claim 6, wherein a first portion of the second number of the antenna elements in the second subset are configured as passive elements.

8. The method of claim 7, wherein a second portion of the second number of the antenna elements in the second subset are configured as sensor elements.

9. The method of claim 7 further comprising determining, based on at least one of a target antenna gain or a target scanning angle, one or both of:
location, in the antenna array, of the first number of the antenna elements in the second subset configured as active for radiating energy;
location, in the antenna array, of the first portion of the second number of the antenna elements in the second subset configured as passive elements.

10. A system containing a reconfigurable over-indexed antenna array, the system comprising:
an over-indexed antenna array having a plurality of antenna elements wherein each antenna element is reconfigurable for multiple uses comprising configuration as a sensor element that is non-active for radiating energy;
a set of sensors configured to provide sensor input that indicates an object blocking a first subset of the plurality of antenna elements but not blocking a second subset of the plurality of antenna elements wherein antenna elements configured as sensor elements are also configured to provide the sensor input;
a controller coupled to the set of sensors and the over-indexed antenna array, wherein the controller is configured to:
receive the sensor input;
configure, based on the sensor input, a number of the antenna elements in the first subset as non-active for radiating energy;

configure, based on the sensor input, a number of the antenna elements in the second subset as active for radiating energy.

11. The system of claim 10, wherein each antenna element is reconfigurable as active for radiating energy or as a passive element that is non-active for radiating energy.

12. The system of claim 10 further comprising an array of switches coupling the controller to the antenna array, wherein each switch in the array of switches has a first switch position to configure an antenna element as active for radiating energy, a second switch position to configure the antenna element as the sensor element, and a third switch position to configure the antenna element as the passive element.

13. The system of claim 10 further comprising a transceiver component having a plurality of transceiver paths, wherein the antenna array includes enough antenna elements to form multiple groups of antenna elements with each group of antenna elements being coupled to a different transceiver path of the plurality of transceiver paths to implement multi-input and multiple output communications.

14. The system of claim 10 further comprising a housing, wherein the antenna array is coupled within an interior of the housing.

15. The system of claim 10 further comprising a housing, wherein the antenna array is coupled to an exterior of the housing in an area suitable for mounting antenna elements.

16. The system of claim 15, wherein the plurality of antenna elements are substantially equally spaced, have a substantially similar height and shape, and substantially fill the entire area suitable for mounting antenna elements.

17. The system of claim 10 further comprising a transceiver component, wherein the antenna array is capacitively coupled to the transceiver component.

18. The system of claim 10 further comprising a transceiver component, wherein the antenna array is connected by a direct feed from the transceiver component.

* * * * *